United States Patent [19]

England et al.

[11] Patent Number: 5,039,062
[45] Date of Patent: Aug. 13, 1991

[54] TAMPER PROOF VALVE

[76] Inventors: Frank R. England, 4819 Old Mooringsport Rd.; Robert E. Davis, 4281 Linda La., both of Shreveport, La. 71107

[21] Appl. No.: 535,554

[22] Filed: Jun. 11, 1990

[51] Int. Cl.⁵ ............................................. F16K 35/00
[52] U.S. Cl. ..................................... 251/95; 70/175; 70/218; 137/385; 251/102; 251/110; 251/292
[58] Field of Search ................. 70/175, 188, 218, 219, 70/220, 221, 222, 223, 231; 137/384.2, 384.4, 384.8, 385; 192/67 R, 67 D; 251/95, 101, 102, 104, 110, 112, 292

[56] References Cited

U.S. PATENT DOCUMENTS

| | | | |
|---|---|---|---|
| 981,630 | 1/1911 | Franks | 251/292 |
| 992,502 | 5/1911 | Hollis | 251/292 |
| 1,040,327 | 10/1912 | Hollis | 251/292 |
| 1,134,678 | 4/1915 | Hollis | 251/292 |
| 1,162,935 | 12/1915 | Lange | 251/292 |
| 2,602,351 | 7/1952 | Ringler et al. | 251/292 |
| 2,780,333 | 2/1957 | Reiser et al. | 251/292 |
| 2,944,784 | 7/1960 | Jaros | 251/110 |
| 3,796,074 | 3/1974 | Vik | 70/231 |
| 3,802,459 | 4/1974 | Geraudie | 137/384.6 |
| 4,848,112 | 7/1989 | Graber et al. | 70/231 |

Primary Examiner—George L. Walton
Attorney, Agent, or Firm—John M. Harrison

[57] ABSTRACT

A tamper-proof valve which includes a valve body fitted with a transverse bore, an entry port and outlet port communicating with the transverse bore and an inner body seat for receiving a tapered inner body having a notch adapted for manipulation in alignment with the entry port and outlet port in open configuration and transverse to the entry port and outlet port, in closed configuration. A plug is provided on the top of the inner body for seating one end of a spring which is slidably encased in a collet. A square key is also slidably disposed in one end of the collet and is adapted to seat in a key seat provided in a top valve assembly which mounts on the valve body. An allen screw having a tamper-proof tool receptacle is threaded in the top valve assembly in alignment with the key, such that a special tool may be inserted in the allen screw tool receptacle and the allen screw rotated in the clockwise direction (when viewing the valve body from the top) to seat against the key, compress the spring inside the collet, remove the key from the key seat located in the top valve assembly and facilitate rotation of the top valve assembly independently of the inner body. Rotation of the allen screw in the opposite, or counterclockwise direction allows the spring to force the key upwardly into the key seat and facilitate opening and closing the inner body and the valve body in concert.

17 Claims, 1 Drawing Sheet

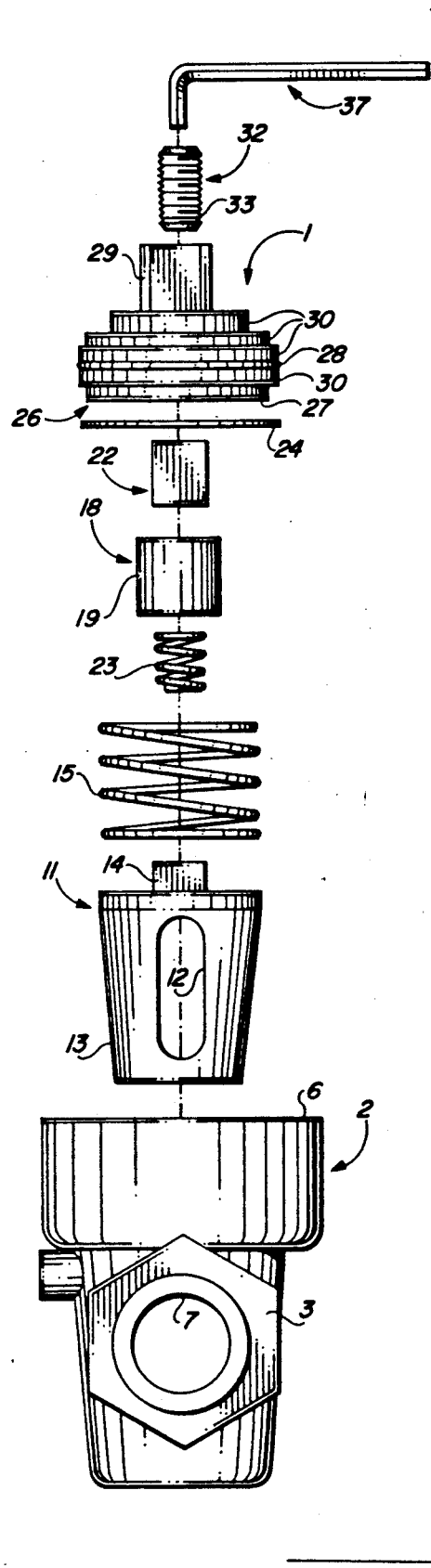
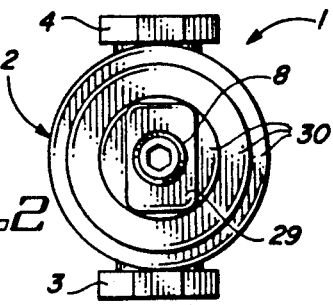
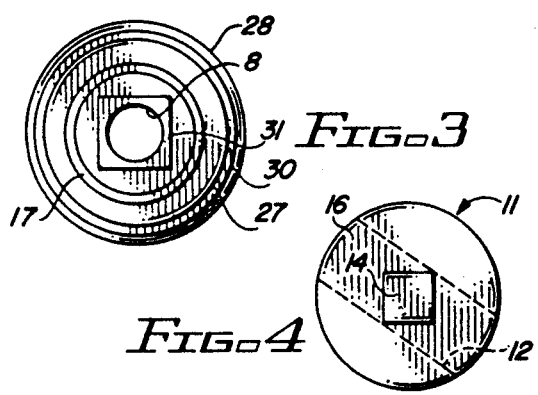
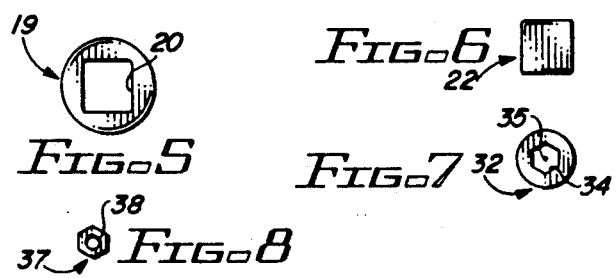
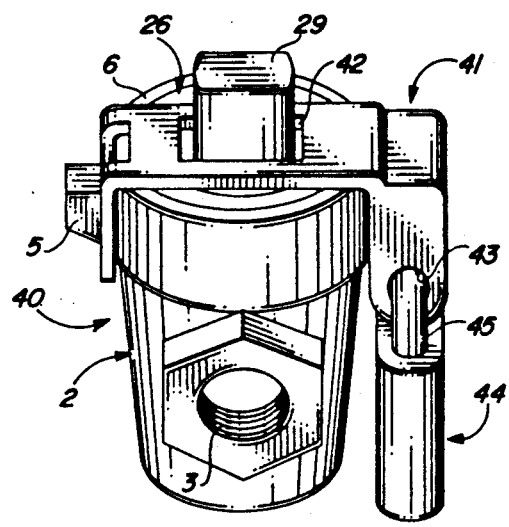

TAMPER PROOF VALVE

BACKGROUND OF THE INVENTION

1. Field of the Invention

This invention relates to tamper-proof valves and more particularly, to a locking assembly for rendering valves tamper-proof, which valves include a valve body fitted with an inner body, a top valve assembly closure and the locking assembly components. In a preferred embodiment these components include a spring-loaded key slidably located in a square opening provided in a collet disposed between the top valve assembly and the inner body. An allen screw having a tamper-proof tool receptacle is threaded in the top valve assembly and serves to engage and disengage the locking assembly by seating against the top of the key and forcing the key downwardly against the bias of a coil spring, also located in the collet opening. This action removes the top portion of the key from a key seat located in the top valve assembly and facilitates rotation of the top valve assembly independently of the inner body. Operation of the valve is effected by rotating the allen screw in the opposite direction to reduce tension on the spring, allow the key to move upwardly and seat in the key seat and facilitate manipulation of the top valve assembly and inner body in concert into the open or closed position. The allen screw is characterized by a tamper-proof design, wherein a tamper-proof pin is located in the wrench receptacle to accommodate a corresponding allen wrench having a pin opening for matching the pin. The tamper-proof valve of this invention can be used to control the flow of gases and liquids, as well as slurries and the like, in a wide variety of applications involving substantially any fluid. The tamper-proof valve is primarily designed for use on conventional consumer gas meters to quickly and easily prevent unauthorized use of the gas meters.

One of the problems which exists in conventional gas meters is that of preventing the flow of gas through the meters under circumstances where gas consumer service is terminated due to nonpayment of user's bills or for other reasons. Probably the most commonly used technique for terminating gas service is locking the service line valve into the closed position with a padlock. However, the lock can be easily removed with a bolt cutter and the gas service illegally restored. Accordingly, the only sure way of interrupting gas service to a user is to remove the gas meter, which requires initially terminating the gas flow at the service line valve and then removing the gas meter valve by a service man.

2. Description of the Prior Art

Various valves having locking mechanisms are known in the art and typical of these designs are the valves detailed in the following U.S. Pat. Nos.: 1,855,414; 2,161,509; 2,309,304; 2,399,578; 2,748,974; 4,465,092; and 4,534,379.

It is an object of this invention to provide a tamper-proof gas meter valve which is mounted in the gas service line with a conventional gas meter and can be quickly and easily operated with a specially equipped allen wrench to terminate the gas service and subsequently restore gas service, as necessary.

A still further object of this invention is to provide an all-purpose tamper-proof valve which is designed to be opened and closed by manipulation of a tamper-proof tool such as a specially-equipped allen wrench, to selectively seat and unseat a spring-loaded key located in the interior of the valve by threadable manipulation of the allen screw.

Still another object of the invention is to provide a tamper-proof valve which is characterized by a conventional valve body and a specially designed inner body and top valve assembly which accommodate a key slidably mounted in a collet against the bias of a spring located between the inner body and the top valve assembly, wherein the key is selectively manipulated into and from a key seat located in the top valve assembly by operation of an allen screw having a tamper-proof tool receptacle and threadably seated in the top valve assembly.

Yet another object of this invention is to provide a tamper-proof locking assembly for installation in a valve and rendering the valve tamper-proof, which locking assembly includes a key seat shaped in the top valve assembly of the valve, a key adapted for slidably engaging and disengaging the key seat, and a collet having a collet opening for receiving a coil spring seated on the inner body of the valve and contacting one end of the key, wherein the key engages the spring such that threadable advancement of an allen screw located in the top valve assembly unseats the key from the key slot and allows rotation of the top valve assembly independently of the inner body, and threadable advancement of the allen screw in the opposite direction allows the spring to reseat the key in the key slot and facilitate rotation of the top valve assembly and the inner body in concert.

SUMMARY OF THE INVENTION

These and other objects of the invention are provided in a tamper-proof valve having a valve body, a rotatable inner body located in the valve body and a top valve assembly closing the valve body and further characterized by a tamper-proof locking assembly which includes a key slidably manipulated by an allen screw located in the top valve assembly and slidably seated in a collet and in a key seat, also located in the valve assembly, against the bias of a spring located in the collet between the top valve assembly and the inner body, such that the key is selectively seated in the key seat by the spring to facilitate operation of the valve and forced from the key seat to prevent operation of the valve, by operation of an allen screw.

BRIEF DESCRIPTION OF THE DRAWING

The invention will be better understood by reference to the accompanying drawing, wherein:

FIG. 1 is an exploded view of a preferred embodiment of the tamper-proof valve of this invention;

FIG. 2 is a top view of the top valve assembly of the tamper-proof valve illustrated in FIG. 1;

FIG. 3 is a bottom view of the top valve assembly of the tamper-proof valve illustrated in FIG. 1;

FIG. 4 is a top view of the inner body component of the tamper-proof valve illustrated in FIG. 1;

FIG. 5 is a top view of a collet element of the locking assembly in the tamper-proof valve illustrated in FIG. 1;

FIG. 6 is a top view of a key element of the locking assembly;

FIG. 7 is a top view of the tamper-proof allen screw element of the locking assembly;

FIG. 8 is an end view of a tamper-proof allen wrench adapted for engaging the tamper-proof allen screw illustrated in FIGS. 1 and 7; and FIG. 9 is a perspective view of a conventional gas valve, more particularly illustrating a conventional locking apparatus for securing the valve in closed configuration.

DESCRIPTION OF THE PREFERRED EMBODIMENTS

Referring initially to FIG. 9 of the drawing, a conventional gas valve 40 is illustrated and includes a valve body 2, a top valve assembly 26, mounted on the valve body 2 and provided with an upward-standing drive plug 29, which is normally used to open and close the conventional valve 40 by rotating an inner body (not illustrated) seated inside the valve body 2. A retaining collar 41 is seated on a retaining flange 5 of the valve body 2, and the drive plug 29 extends through a collar slot 42 in the retaining collar 41. The bolt 45 of a padlock 44 extends through padlock openings 43, located in spaced arms of the retaining collar 41 and through a corresponding opening (not illustrated) in another flange (not illustrated) provided on the valve body 2, to secure the retaining collar 41 on the conventional valve 40 and prevent rotation of the drive plug 29 and operation of the conventional valve 40.

Referring now to FIGS. 1-8 of the drawing, the tamper-proof valve of this invention is generally illustrated by reference numeral 1. The tamper-proof valve 1 includes a valve body 2, provided with a transverse body bore 7, which extends through an entry port 3 and an oppositely-disposed outlet port 4. A tapered inner body seat (not illustrated) is also provided in the valve body 2 and a valve body flange 6 extends around the top periphery of the valve body 2. An inner body 11 is characterized by an inner body taper 13, which matches the taper of the inner body seat of the valve body 2 when the tamper-proof valve 1 is assembled. A vertical inner body notch 12 is provided in the inner body 11 as illustrated in FIG. 1 and the inner body notch 12 aligns with the body bore 7 when the inner body 11 is manipulated such that fluid flow is facilitated through the tamper-proof valve 1, as hereinafter further described. An inner body plug 14 projects upwardly from the top surface of the inner body 11 as illustrated in FIGS. 1 and 4, for purposes which will be hereinafter further described. A top valve assembly 26 is designed to seat on the top of the valve body 2 and close the inner body 11 inside the valve body 2. The top valve assembly 26 includes an assembly flange 27, which seats inside the valve body flange 6 located on the valve body 2 and an O-ring 28 is seated in a groove (not illustrated) provided in the O-ring flange 30, as further illustrated in FIGS. 1-3. A narrow drive plug 29 projects from the top of the O-ring flange 30 to facilitate engagement by a wrench (not illustrated) and manipulating the top valve assembly 26 to open and close the valve, as hereinafter further described. As further illustrated in FIGS. 1, 2, 7 and 8, an allen screw 32 is threadably seated in an allen screw seat 8, provided in the drive plug 29 and the O-ring flange 30 of the top valve assembly 26, by means of allen screw threads 33. A wrench receptacle 34 is shaped in the top surface of the allen screw 32 for receiving one end of a specially designed allen wrench 37, illustrated in FIGS. 1 and 8. A tamper-proof pin 35 is provided in the wrench receptacle 34 and is designed to seat in a corresponding pin opening 38, provided in the end of the allen wrench 37, as further illustrated in FIG. 8. An inner body spring 15 and a sealing ring 24 are disposed between the inner body 11 and the top valve assembly 26, as further illustrated in FIG. 1.

Referring now to FIGS. 1 and 3-6 of the drawing, the locking assembly 18 includes a cylindrical collet 19, disposed between the top valve assembly 26 and the inner body 11 and provided with a square collet opening 20, for receiving a correspondingly shaped key 22. A key spring 23 is also designed to fit in the collet opening 20 and seat against the bottom of the key 22 when the tamper proof valve 1 is assembled. The opposite end of the spring likewise seats against the top of the square inner body plug 14, projecting from the inner body 11, and the inner body plug 14 also remains seated in the bottom end of the collet opening 20, as further illustrated in FIGS. 1, 4 and 5. The top end of the key 22 is designed to removably seat in a key seat 31, provided in the inside center portion of the top valve assembly 26, as illustrated in FIG. 3 and is normally biased in registration with the key seat 31 by operation of the key spring 23, when the tamper proof valve 1 is assembled and the allen screw 32 is threaded upwardly in the drive plug 29.

In operation, and referring again to FIGS. 1-3 of the drawing, since the key 22 normally engages the corresponding key seat 31, provided in the top valve assembly 26 responsive to the bias of the key spring 23 when the allen screw 32 is threaded upwardly in the allen screw seat 8 inside the drive plug 29, and the collet 19 always engages the inner body plug 14 of the inner body 11, manipulation of the top valve assembly 26 by placing a wrench on the drive plug 29 also rotates the inner body 11, to open or close the tamper-proof valve 1. Accordingly, when the inner body 11 is manipulated such that the inner body notch 12 is aligned with the body bore 7 and the valve body 2, fluid may flow through the tamper proof valve 1 in a non-restricted manner. However, when the drive plug 29 and top valve assembly 26 are rotated in a position 90° disposed from the position illustrated in FIG. 1, the inner body notch 12 is also disposed in the same 90° configuration, to block the flow of fluid through the tamper-proof valve 1. When the allen wrench 37 is inserted in the wrench receptacle 34 of the allen screw 32 and the allen screw 32 is rotated in the clockwise direction, as the tamper-proof valve 1 is viewed from the top, the allen screw 32 contacts the top of the key 22 and forces the key 22 downwardly against the bias of the key spring 23. This action removes the top portion of the key 22 from the key seat 31, thereby disengaging the top valve assembly 26 from the inner body 11 and allowing the top valve assembly 26 to rotate freely in a 360° circle. The tamper-proof valve 1 therefore cannot then be operated so long as the allen screw 32 is contacting the key 22 and forcing the key 22 from the key seat 31. However, when the allen screw 32 is reversed by again threadably operating the allen wrench 37 in the opposite or counterclockwise direction, the key spring 33 again forces the key 22 upwardly, such that the key 22 again engages the allen screw seat 8 to again engage the top valve assembly 26 and the inner body 11. This action facilitates opening and closing the tamper proof valve 1 at will by placing the wrench on the drive plug 29 and threadably rotating the top valve assembly 26 accordingly.

It will be appreciated by those skilled in the art that the allen screw 32 may be provided with a wrench receptacle 34 of any desired configuration and a tamper proof pin 35 of any desired size and/or configuration, to match a correspondingly shaped allen wrench 37. This feature prevents an ordinary allen wrench or other tool from being used to rotate the allen screw 32 inside the drive plug 29 and facilitate engagement of the locking assembly 18 at will, to operate the tamper-proof valve 1.

It will also be appreciated by those skilled in the art that the tamper-proof valve 1 can be utilized to control the flow of substantially any fluid, including gases, liquids, slurries and other fluids, regardless of the nature or the composition of such fluids. Accordingly, while the tamper-proof valve 1 is designed primarily for use in conventional gas meters in order to prevent the unauthorized operation of the gas meters, the device may also be used in many other services under any circumstances where it is desired to prevent unauthorized operation of the valve in such services.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A tamper-proof valve comprising a valve body, an inner body rotatably disposed in said valve body for selectively opening and closing the valve body to fluid flow, a top valve assembly for retaining said inner body inside valve body and closing said valve body, tamper-proof means movably seated in said top valve assembly and a locking assembly joining said inner body and said top valve assembly, said locking assembly further comprising a key slot provided in said top valve assembly, said key slot substantially aligned with said tamper-proof means; key means contacting said tamper-proof means and adapted for slidably engaging said key slot and disengaging said key slot; a collet having a collet opening slidably receiving at least a portion of said key means; bias means disposed in said collet opening for engaging said key means; and an inner body plug extending from said inner body and seated in said collet opening in contact with said bias means, whereby said key means is displaced entirely from said key slot and said at least a portion of said key means is displaced further into said collet opening to facilitate free rotation of said top valve assembly with respect to said valve body, responsive to manipulation of said tamper-proof means in said top valve assembly in one direction and said key means engages said key slot and said at least a portion of said key means is displaced further out of said collet opening to facilitate rotation of said inner body in concert with said top valve assembly, responsive to manipulation of said tamper-proof means in said top valve assembly in the opposite direction.

2. The tamper-proof valve of claim 1 wherein said key means further comprises a key having a cross-sectional configuration in the shape of a polygon, and said collet opening and said inner body plug are shaped in the configuration of said polygon.

3. The tamper-proof valve of claim 2 wherein said polygon is a square.

4. The tamper-proof valve of claim 1 wherein said bias means further comprises a coil spring.

5. The tamper-proof valve of claim 1 wherein:
(a) said bias means further comprises a coil spring; and
(b) said key means further comprises a key having a cross-sectional configuration in the shape of a polygon, and said collet opening and said inner body plug are shaped in the configuration of said polygon.

6. The tamper-proof valve of claim 1 wherein said tamper-proof means further comprises a screw and a tamper-proof receptacle provided in said screw.

7. The tamper-proof valve of claim 1 wherein:
(a) said key means further comprises a key having a cross-sectional configuration in the shape of a polygon and said collet opening and said inner body plug are shaped in the configuration of said polygon;
(b) said bias means further comprises a coil spring; and
(c) said tamper-proof means further comprises a screw and tamper-proof receptacle provided in said screw.

8. The tamper-proof valve of claim 7 wherein said polygon is a square and said screw is an allen screw threadably disposed in said top valve assembly.

9. In a tamper-proof valve having a valve body, an inner body rotatably disposed in said valve body for selectively facilitating and blocking fluid flow through said valve body and a top valve assembly seated on said valve body for enclosing said inner body in said valve body, the improvement in combination therewith comprising tamper-proof means movably seated in said top valve assembly and a locking assembly characterized by a key slot provided in said top valve assembly said key slot substantially aligned with said tamper-proof means; key means contacting said tamper-proof means and adapted for slidably engaging said key slot and disengaging said key slot; a collet having a collet opening slidably receiving at least a portion of said key means; bias means disposed in said collet opening for engaging said key means; and an inner body plug extending from said inner body and seated in said collet opening in contact with said bias means, whereby said key means is displaced entirely from said key slot and said at least a portion of said key means is displaced further into said collet opening to facilitate free rotation of said top valve assembly with respect to said valve body, responsive to manipulation of said tamper-proof means in said top valve assembly in one direction and said key means engages said key slot and said at least a portion of said key means is displaced further out of said collet opening to facilitate rotation of said inner body in concert with said top valve assembly, responsive to manipulation of said tamper-proof means in said top valve assembly in the opposite direction.

10. The tamper-proof valve of claim 9 wherein:
(a) said bias means further comprises a coil spring;
(b) said key means further comprises a key having a cross-sectional configuration in the shape of a polygon and said collet opening and said inner body plug are shaped in the configuration of said polygon; and
(c) said tamper-proof means further comprises an allen screw and a tamper-proof receptacle provided in said allen screw.

11. The tamper-proof valve of claim 10 wherein said polygon is a square.

12. In a tamper-proof valve having a valve body, an inner body rotatably disposed in said valve body for selectively facilitating and blocking fluid flow through said valve body and a top valve assembly seated on said valve body for enclosing said inner body in said valve body, the improvement comprising tamper-proof means movably seated in said top valve assembly and a locking assembly characterized by a key slot provided in said top valve assembly, said key slot substantially aligned with said tamper-proof means; key means contacting said tamper-proof means and adapted for slidably engaging said key slot and disengaging said key slot; a collet having a collet opening slidably receiving at least a portion of said key means; bias means disposed in said collet opening for engaging said key means; and an inner body plug extending from said inner body and seated in said collet opening in contact with said bias means, whereby said key means is displaced entirely from said key slot and said at least a portion of said key means is displaced further into said collet opening to facilitate free rotation of said top valve assembly with respect to said valve body, responsive to manipulation of said tamper-proof means in said top valve assembly in one direction and said key means engages said key slot and said at least a portion of said key means is displaced further out of said collet opening to facilitate rotation of said inner body in concert with said top valve assembly, responsive to manipulation of said tamper-proof means in said top valve assembly in the opposite direction.

13. The tamper-proof valve of claim 12 wherein said tamper-proof means further comprises a screw and a tamper-proof receptacle provided in said screw.

14. The tamper-proof valve of claim 12 wherein said key means further comprises a key having a cross-sectional configuration in the shape of a polygon and said collet opening and said inner body plug are shaped in the configuration of said polygon.

15. The tamper-proof valve of claim 12 wherein said bias means further comprises a coil spring.

16. The tamper-proof valve of claim 12 wherein:
(a) said tamper-proof means further comprises an allen screw and a tamper-proof receptacle provided in said allen screw;
(b) said key means further comprises a key having a cross-sectional configuration in the shape of a polygon and said collet opening and said inner body plug are also shaped in the configuration of said polygon; and
(c) said bias means further comprises a coil spring.

17. The tamper-proof valve of claim 16 wherein said polygon is a square.

* * * * *